United States Patent [19]
Goforth

[11] 3,748,773
[45] July 31, 1973

[54] FISHING LURE
[76] Inventor: David Langston Goforth, 613 W. Kemp Rd., Greensboro, N.C.
[22] Filed: Dec. 27, 1971
[21] Appl. No.: 211,985

[52] U.S. Cl.............. 43/42.1, 43/42.24, 43/42.37, 43/44.4, 43/44.6, 43/44.8
[51] Int. Cl..................... A01k 83/06, A01k 85/00
[58] Field of Search.............. 43/42.24, 42.1, 42.29, 43/42.37, 42.38, 42.41, 44.2, 44.4, 44.6, 44.8

[56] References Cited
UNITED STATES PATENTS

| | | | |
|---|---|---|---|
| 3,465,466 | 9/1969 | Showalter | 43/44.8 |
| 1,464,571 | 8/1923 | Hanson | 43/44.4 |
| 2,820,314 | 1/1958 | Scott | 43/42.1 |
| 1,250,189 | 12/1917 | Kinsey | 43/42.24 |
| 2,319,246 | 5/1943 | Martin | 43/44.6 |
| 2,938,296 | 5/1960 | Kracht | 43/44.8 X |

Primary Examiner—Robert Peshock
Assistant Examiner—Daniel J. Leach
Attorney—David Rabin

[57] ABSTRACT

A fishing lure including a flexible body having a head portion with the shank of a fishhook passing therethrough. A resilient retainer member is attached to the shank, adjacent the ends, for preventing disengagement of the body from the hook after a fish has seized the lure.

8 Claims, 9 Drawing Figures

PATENTED JUL 31 1973 3,748,773
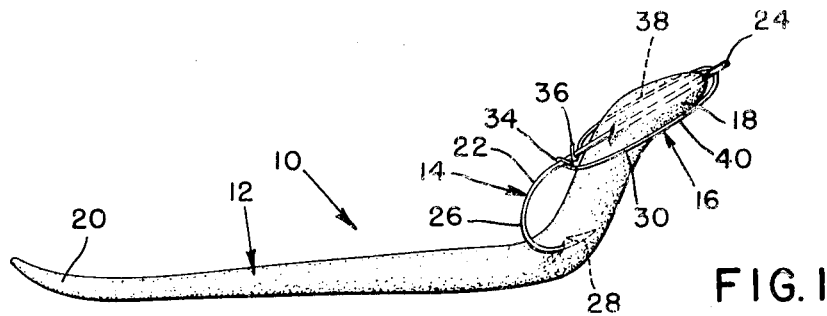
FIG. 1
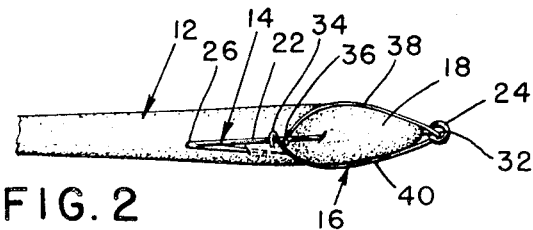
FIG. 2
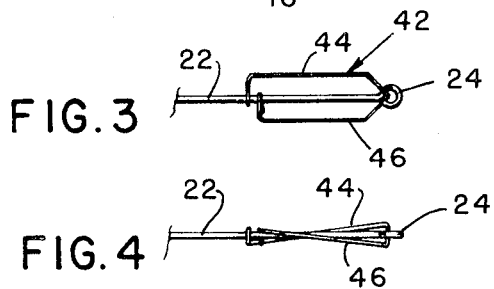
FIG. 3
FIG. 4
FIG. 5
FIG. 6
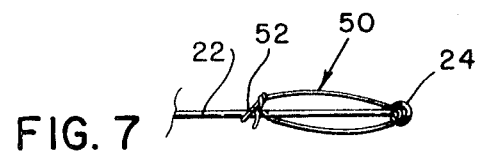
FIG. 7
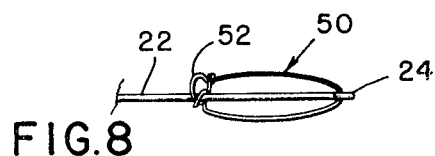
FIG. 8
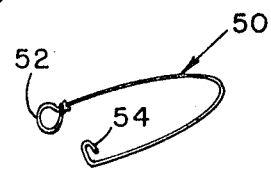
FIG. 9
INVENTOR
DAVID L. GOFORTH

FISHING LURE

BRIEF SUMMARY AND OBJECTS OF THE INVENTION

This invention generally relates to fishing lures designed to represent worms or other live bait and more particularly to a lure having an elongated, flexible body having a head portion attached to a hook shank.

Difficulty has been encountered with such conventional lures resulting in the lure flexible body being torn or pulled from the hook shank, especially after a fish has seized the lure. In order to overcome such difficulties, a retainer or suitable member has been provided on the hook for preventing disengagement of the flexible body therefrom.

The retainer is adapted to loop around the head portion of the body thereby preventing rearward movement of the body relative to the hook shank. The retainer may pass through the eyelet of the shank, extend rearwardly on each side of the head, and terminate in hook portions adapted to engage the shank just rearwardly of the head.

One of the primary objects of the invention is the provision of a fishing lure wherein the lure flexible body portion is prevented from disengaging the hook shank portion.

Another object of the invention is the provision of an improved fishing lure having a retainer for preventing disengagement of the body from the hook and which will not intefere with the engagement of the hook with a fish.

Still another object of the invention is the provision of a retainer for a fishing lure which is highly practical and effective in preventing disengagement of the flexible body from the hook shank.

Other objects and advantages of the invention will become apparent when considered in view of the following detailed description.

BRIEF DESCRIPTION OF THE FIGURES

FIG. 1 is a side elevational view of fishing lure comprising an elongated flexible body member having a head portion mounted upon the shank of a hook and a retainer in surrounding relation with the head portion;

FIG. 2 is a fragmentary top plan view of the fishing lure of FIG. 1;

FIG. 3 is a top plan view of a modified embodiment of a retainer mounted upon a hook;

FIG. 4 is a side elevational view of the retainer of FIG. 3;

FIG. 5 is a top plan view of still another embodiment of a retainer mounted upon a hook;

FIG. 6 is a side elevational view of the retainer and hook of FIG. 5;

FIG. 7 is a top plan view of a further embodiment of a retainer mounted upon a hook;

FIG. 8 is a side elevational view of the retainer and hook of FIG. 7; and

FIG. 9 is a perspective view of the retainer of FIGS. 7 and 8.

DETAILED DESCRIPTION OF THE INVENTION

Referring to the drawing and particularly to FIGS. 1 and 2, the improved fishing lure 10 of this invention includes a body 12, a hook 14 and a retainer 16.

The body 12 is generally elongated having a head portion 18 and a tail portion 20, the head 18 being angularly offset relative to the remainder of the body. The flexible body may be of soft plastic or rubber, preferably of molded construction, to obtain a life-like action as the lure is drawn through water.

The hook 14 has an elongated shank 22 provided with a line attaching eyelet 24 at one end, and at the other end a hook bill 26 terminating in a barb 28. The hook 14 preferably is molded within the head of the body portion during the construction of the lure. Normally the barb 28 of the hook is located within the body portion 12, as shown by FIGS. 1 and 2, to protect the hook from snagging on weeds and other underwater objects while permitting a fish to seize the lure and be hooked thereby.

The retainer member 16 prevents excessive rearward movement by the head portion 18 relative to the hook shank 22. The retainer member 16 is of resilient construction, spring wire or thermoplastic material, adapted to engage the shank 22 on each end of the head portion 18. In a preferred embodiment, the retainer is formed from a single length of stainless steel resilient wire 30 of a selected gauge. The wire is bent upon itself approximately midway between its ends as at 32 to form a vertex, and bowed outwardly and rearwardly and then inwardly to form limbs 38 and 40 on each side of the head portion 18 before engaging the shank 22. The rear end portions of the limbs 38 and 40 are formed into hooks 36 and 34 adapted to be bent around and engage the hook shank 22.

FIGS. 3 and 4 refer to a modified embodiment of a resilient wire retainer 42 having an intermediate portion looped through the eyelet 24 and rearwardly extending limbs 44, 46. Note that the limbs 44, 46 cross to opposite sides of the shank as shown in FIG. 4.

FIGS. 5, 6 and FIGS. 7-9 disclose further embodiments of retainers 48 and 50, respectively. The retainer 50 has a loop 52 at one end which surrounds the hook shank 22 and a hook 54 at the other end which may interlock with the shank and the loop 52.

I claim

1. A fishing lure comprising in combination, an elongated flexible body having a head at one end and a tail at the other end, a hook having a shank, a portion of said shank being embedded within said body head, said shank having an eyelet at one end and a hook bill terminating in a barb at the other end, and means secured to said shank for retaining said body on said hook shank, said means including limb portions extending generally toward said hook bill and each terminating in a hook for interlocking with said hook shank rearwardly of said body head.

2. A fishing lure as recited in claim 1, wherein said retaining means partially encompasses said body head portion to prevent disengagement of said body from said hook.

3. A fishing lure as recited in claim 1, said body being of molded, elastomeric construction.

4. A fishing lure as recited in claim 1, wherein said hook shank passes through said head portion and said hook barb is embedded within said flexible body.

5. A fishing lure as recited in claim 1, wherein said retaining means includes a portion intermediate said limbs passing through said eyelet, said rearwardly directed limbs engaging and gripping the sides of said head portion.

6. A fishing lure as recited in claim 5, wherein one of said limbs has a loop at one end which surrounds the hook shank and the other limb has a hook at the end which interlocks with the shank and the loop.

7. A fishing lure as recited in claim 5, said limbs tightly surrounding and bearing against the rear of said head portion to prevent removal of said head portion from said shank.

8. A fishing lure as recited in claim 1, wherein said rearwardly directed limbs cross to opposite sides of the shank intermediate said portion passing through said eyelet and said hooks.

* * * * *